United States Patent
Cariou et al.

(10) Patent No.: US 11,943,701 B2
(45) Date of Patent: Mar. 26, 2024

(54) NEIGHBOR REPORT FOR AN ACCESS POINT MULTI-LINK DEVICE

(71) Applicant: Intel Corporation, Santa Clara, CA (US)

(72) Inventors: Laurent Cariou, Milizac (FR); Po-Kai Huang, San Jose, CA (US); Necati Canpolat, Beaverton, OR (US); Carlos Cordeiro, Portland, OR (US); Daniel F. Bravo, Hillsboro, OR (US); Arik Klein, Givaat Shmuel (IL); Danny Ben-Ari, Hasharon Hatichon (IL); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 17/131,545

(22) Filed: Dec. 22, 2020

(65) Prior Publication Data

US 2021/0112490 A1     Apr. 15, 2021

Related U.S. Application Data

(60) Provisional application No. 62/984,625, filed on Mar. 3, 2020.

(51) Int. Cl.
*H04W 48/16* (2009.01)
*H04W 48/20* (2009.01)
(Continued)

(52) U.S. Cl.
CPC .......... *H04W 48/16* (2013.01); *H04W 48/20* (2013.01); *H04W 84/12* (2013.01); *H04W 88/08* (2013.01)

(58) Field of Classification Search
CPC ..... H04W 48/16; H04W 48/14; H04W 48/08; H04W 8/14; H04W 48/20; H04W 12/73;
(Continued)

(56) References Cited

U.S. PATENT DOCUMENTS

2017/0245203 A1* 8/2017 Cariou ................. H04W 48/14
2018/0035431 A1* 2/2018 Cordeiro ........... H04W 72/0453
(Continued)

FOREIGN PATENT DOCUMENTS

WO  WO-2018217310 A1 * 11/2018

*Primary Examiner* — Edan Orgad
*Assistant Examiner* — Vanneilian Lalchinthang
(74) *Attorney, Agent, or Firm* — Schwegman Lundberg & Woessner, P.A.

(57) ABSTRACT

An access point (AP) station (STA) (AP STA) that is part of an AP multi-link device (MLD) may be configured as a reporting AP may encode a BSS Transition Management (BTM) request frame for transmission to one or more associated non-AP stations (STAs). The BTM request frame may include a neighbor report element encoded to include information about one or more neighbor APs. The neighbor report element may indicate whether the one or more neighbor APs identified in the neighbor report element are part of an AP MLD and, when a neighbor AP is indicated to be part of an AP MLD whether the reporting AP is part of the indicated AP MLD. The AP STA may decode a reassociation frame from one of the non-AP STAs for transition from one of the AP STAs of the AP MLD to one of the neighbor APs.

15 Claims, 4 Drawing Sheets (51) Int. Cl.
*H04W 76/11* (2018.01)
*H04W 84/12* (2009.01)
*H04W 88/08* (2009.01)

(58) Field of Classification Search
CPC ... H04W 4/23; H04W 72/0446; H04W 88/08; H04W 74/0808; H04W 76/11; H04W 76/15; H04W 8/245; H04W 84/12; H04W 48/12; H04W 80/02; H04W 88/02; H04W 88/10; H04W 56/0005; H04W 74/0816; H04L 1/1621; H04L 1/1685
USPC .......................................................... 370/338
See application file for complete search history.

(56) References Cited

U.S. PATENT DOCUMENTS

| | | | |
|---|---|---|---|
| 2018/0184365 A1* | 6/2018 | Gidvani | H04W 48/16 |
| 2018/0288664 A1* | 10/2018 | Ouzieli | H04W 36/08 |
| 2021/0014911 A1* | 1/2021 | Patil | H04W 72/0446 |
| 2021/0051574 A1* | 2/2021 | Chu | H04W 84/18 |
| 2021/0076437 A1* | 3/2021 | Kneckt | H04W 76/11 |
| 2021/0250848 A1* | 8/2021 | Seok | H04W 36/06 |
| 2022/0329482 A1* | 10/2022 | Xiao | H04W 40/244 |
| 2022/0338285 A1* | 10/2022 | Zhou | H04W 76/15 |
| 2022/0394756 A1* | 12/2022 | Jang | H04W 74/002 |
| 2022/0408506 A1* | 12/2022 | Kim | H04W 4/40 |

* cited by examiner

NEIGHBOR REPORT FOR AN ACCESS POINT MULTI-LINK DEVICE

PRIORITY CLAIM

This application claims priority under 35 USC 119(e) to U.S. Provisional Patent Application Ser. No. 62/984,625, filed Mar. 3, 2020 [reference number AC8318-Z] which is incorporated herein by reference in its entirety.

TECHNICAL FIELD

Embodiments pertain to wireless communications. Some embodiments relate to wireless local area networks (WLANs). Some embodiments relate to WLAN communications in accordance with the IEEE 802.1 be draft standard (i.e., Extremely High Throughput (EHT)). Some embodiments relate to multi-band data aggregation in EHT networks. Some embodiments relate to multi-link device (MLD) operation in EHT networks.

BACKGROUND

One issue with current WLANs is that there is no mechanism for stations (STAs) to discover of access point (AP) MLDs.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to access point (AP) station (STA) (AP STA) that may be part of an AP multi-link device (MLD). The AP MLD may comprise one or more other AP stations (STAs) (AP STAs). In these embodiments, the AP STA may be configured as a reporting AP. When configured as reporting AP, the AP STA may encode a BSS Transition Management (BTM) request frame for transmission to one or more associated non-AP stations (STAs). The BTM request frame may include a neighbor report element encoded to include information about one or more neighbor APs. In some embodiments, the neighbor report element may indicate whether the one or more neighbor APs identified in the neighbor report element are part of an AP MLD and, when a neighbor AP is indicated to be part of an AP MLD whether the reporting AP is part of the indicated AP MLD (i.e., whether the AP MLD is the same AP MLD that the reporting AP is part of). In some embodiments, the AP STA may decode a reassociation frame from one of the non-AP STAs for transition from one of the AP STAs of the AP MLD to one of the neighbor APs. These embodiments are described in more detail below.

In some embodiments, the one or more associated non-AP STAs may be associated with one of the AP STAs of the AP MLD. In some embodiments, some of the one or more associated non-AP STAs may be part of a non-AP MLD, the AP MLD and the non-AP MLD comprising logical entities. These embodiments are described in more detail below.

In some embodiments, the AP MLD is configured for multi-link operation. In these embodiments, two or more links with the non-AP MLD may be aggregated in which each of the aggregated links use a same traffic identify (TID). In some embodiments, the reassociation frame may be to initiate a fast BSS transition protocol. In some embodiments, the reassociation frame may be received from one of the non-AP STAs for transition to one of the neighbor APs that are indicated to be part of the same AP MLD as the reporting AP. These embodiments are described in more detail below.

In some embodiments, the BTM frame is a BTM request frame. In some embodiments, the BTM frame may be a BTM query frame. In some embodiments, the BTM frame may be a BTM response frame. These embodiments are described in more detail below.

In some embodiments, when the reporting AP is an extremely high throughput (EHT) AP, the AP STA may set an EHT BSSID information field in the neighbor report element to indicate that the AP is an EHT AP and part of an AP MLD. In some of these embodiments, all EHT APs may be part of a AP MLD.

Some embodiments are directed to a non-access point (AP) station (STA) (non-AP STA) that may be part of STA multi-link device (MLD). In these embodiments, the non-AP STA may decode a BSS Transition Management (BTM) request frame from an AP STA of an AP MLD comprising one or more APs. The BTM request frame may include a neighbor report element that includes information about one or more neighbor APs. In these embodiments, the neighbor report element may indicate whether the one or more neighbor APs identified in the neighbor report element are part of an AP MLD and, when a neighbor AP is indicated to be part of an AP MLD whether the reporting AP is part of the indicated AP MLD (i.e., whether the AP MLD is the same AP MLD that the reporting AP is part of). In these embodiments, the non-AP STA may encode a reassociation frame for transmission to one of the AP STAs of the AP MLD identified in the neighbor report element for reassociation. These embodiments are described in more detail below.

Figure 1A:
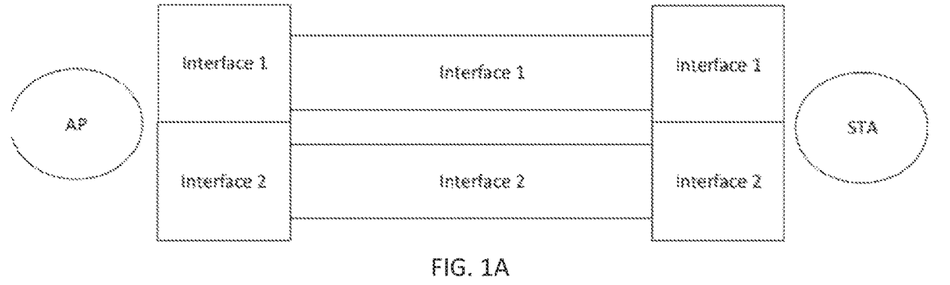
FIG. 1A illustrates multi-band data aggregation in accordance with some embodiments.
Figure 1B:
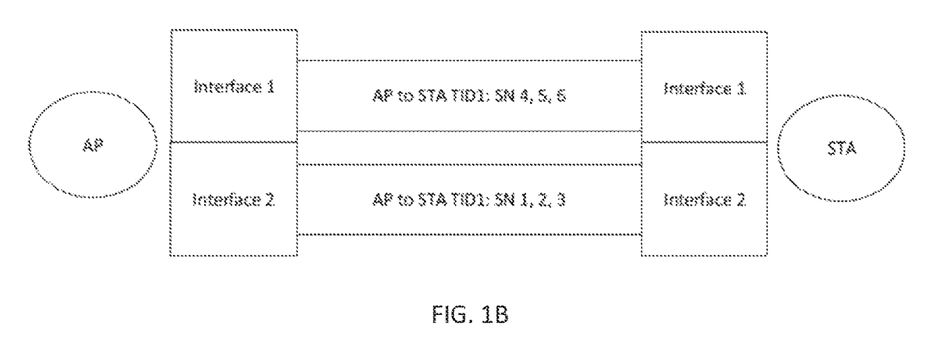
FIG. 1B illustrates multi-band data aggregation with TID and SN using multiple interfaces in accordance with some embodiments.

Some embodiments are directed to a mechanism for multi-band flow control. One of the main features in the scope of EHT is to enable Multi-band data aggregation. A typical scenario for MAC aggregation is shown in FIG. 1A, where AP and STA have multiple interfaces to exchange data simultaneously. For example, AP and STA can negotiated frames related to TID1, such as MU-BAR, BAR, data frame, to be transmitted simultaneously across different interfaces. An example at a specific time frame is shown in FIG. 1B.

Figure 2A:
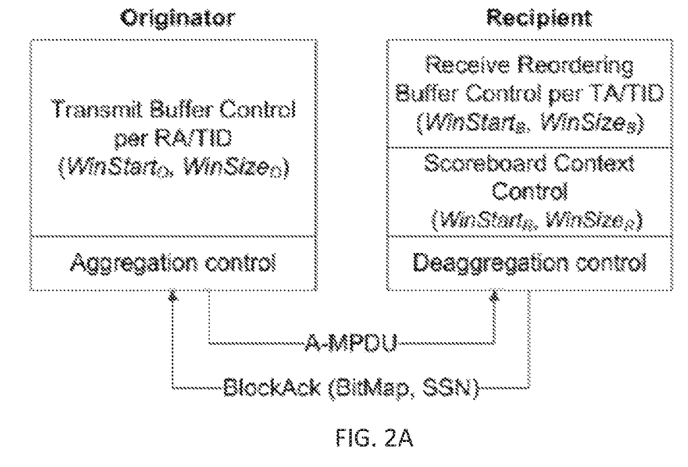
FIG. 2A illustrates a block acknowledgment (BA) architecture in accordance with some embodiments.
Figure 2B:
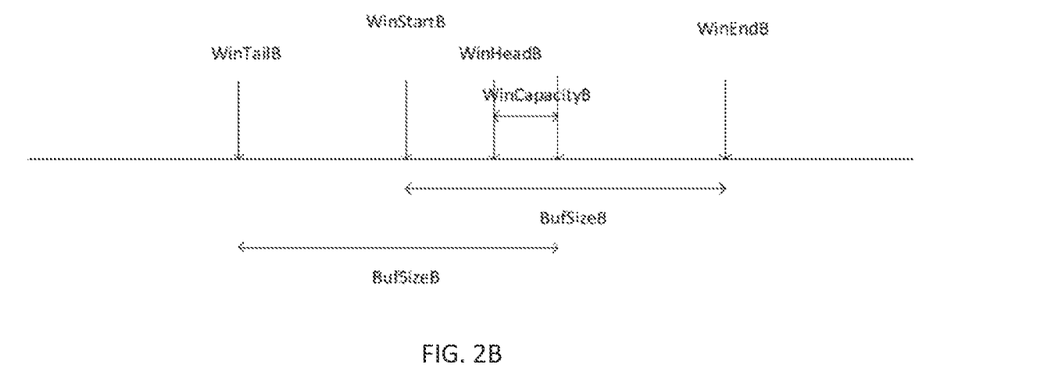
FIG. 2B illustrates receive reordering buffer operation in accordance with some embodiments.

To enable Multi-band Aggregation operation, we have suggested the following:

Allow shared transmit buffer control on transmitter side and receive reordering buffer control on receiver side for a TID across the interfaces Allow BA Bitmap size of a TID across interfaces different from the shared buffer size In IEEE 802.11ad, a common problem for receiver to process packets is that the PHY data rate is much higher than the speed of MAC to pass up data. As a result, 11ad introduces flow control as described below and illustrated in FIGS. 2A and 2B.

Rx side has additional received reordering buffer pointer WinTailB to record the value of the Sequence Number field (SN) of the first (in order of ascending sequence number) MSDU or A-MSDU that has not yet been delivered to the next MAC process Rx side has record of the highest SN received in the current reception range (WinHeadB)

Rx side signals to Tx side about the remaining buffer space (WinCapacityB=WinTailB+BufSizeB−WinHeadB)

Tx side controls the number of packets sending to the receiver (Not beyond WinLimitO=MostSuccSN+WinCapacityO), where MostSuccSN is the highest SN of positively acknowledged MPDUs For details, see IEEE 802.11ad 10.24.11.4 Receive Reordering Buffer with flow control operation.

Processing Delay Consideration in Multi-Band Implementation:

Due to various implementation choices that may exist to realize the MAC aggregation feature, there may be a processing delay for an AP or a STA to process frames coming in different interfaces. For example, for a STA, the delay to process the frames from interface 1 may have delay 0, and the delay to process the frames from interface 2 may be 3 ms.

The various embodiments address the following two issues:

Issue 1: Since AP and STA can certainly negotiate more than two interfaces to transmit, the sum data rate that can arrive at a specific amount of time is huge. In this case, the STA may have slower speed of passing up received MSDU or A-MSDU to the next MAC process than the speed of arriving data.

Issue 2: In legacy Wi-Fi Operation, the order of processing the frames is the same as the order of the arriving time of the frames. In multi-band operation, due to different processing delay in different interfaces, the order of processing the frames is then not the same as the order of the arriving time of the frames.

We provide various examples below to demonstrate the potential problems due to these processing time difference. Assume that AP and STA negotiate TID1 to be aggregated across two interfaces. Assume that the buffer size is 512, and BA bitmap size is 256 for each interface. Assume that the sequence number for data transmission starts with 0. Assume that the processing delay of interface 1 is 0, and the processing delay of interface 2 is 3 ms to 10 ms. (Note that it is basically impossible to get a rough idea about the value of processing time at this point.) It is however expected that the value will be bounded.

Example 1

Figure 3:
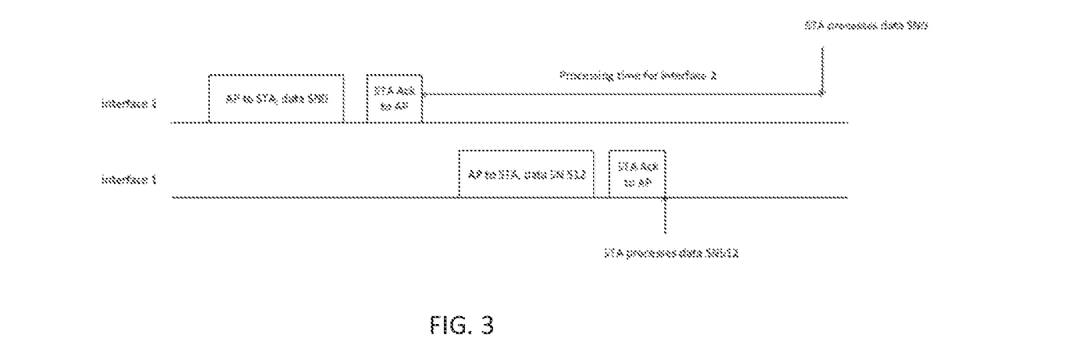
FIGS. 3, 4 and 5 illustrate issues related to BA operation with multiple interfaces.

Assume that somehow, data with sequence number 1 to 511 is received, but data with sequence number 0 is not received. Assume that AP sends data with SN 0 in interface 2 and sends data with SN 512 in interface 1 as shown in FIG. 3. Note that although data with SN 0 arrives earlier in interface 2 than data with SN 512 in interface 1, data with SN 0 is processed later than data with SN 512 in interface 2. When STA processed data with SN 512 in interfaces 2, the buffer is required to move one space to drop the reception of data with SN 0. As a result, when data with SN 0 is processed later, the data with SN 0 is going to be dropped.

Example 2

Figure 4:
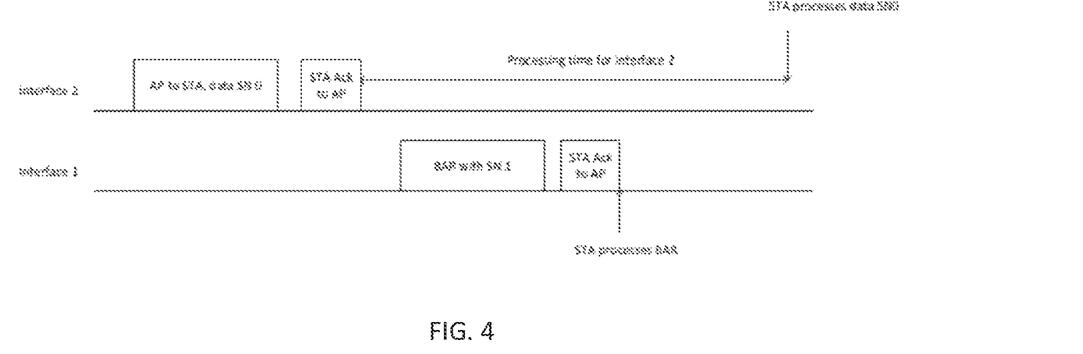

Assume that somehow, data with sequence number 1 to 511 is received, but data with sequence number 0 is not received. Assume that AP sends data with SN 0 in interface 2 and sends BAR with SN 1 in interface 1 as shown in FIG. 4. Note that although data with SN 0 arrives earlier in interface 2 than BAR with SN 1 in interface 1, data with SN 0 is processed later than BAR with SN 1 in interface 2. When STA processed BAR with SN 1 in interfaces 2, the buffer is required to move one space to drop the reception of data with SN 0. As a result, when data with SN 0 is processed later, the data with SN 0 is going to be dropped.

Example 3

Figure 5:
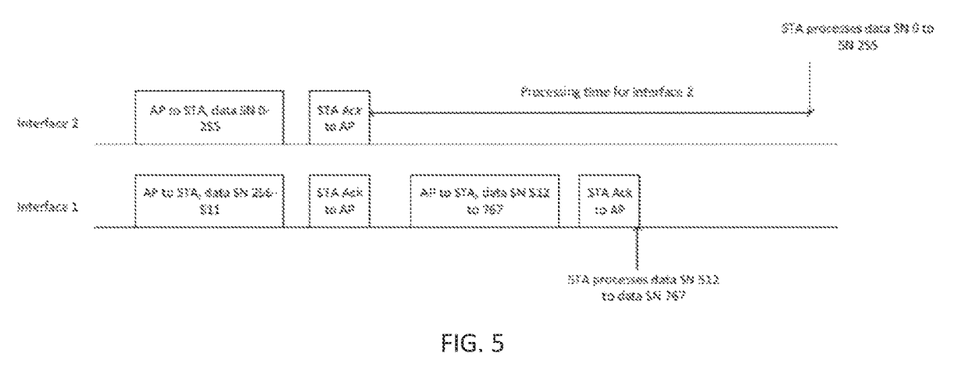

Assume that AP sends data with SN 0 to 255 in interface 2 and sends data with SN 256 to 511 in interface 1 as shown in FIG. 5 Note that although data with SN 0 to 255 arrives the same time in interface 2 as data with SN 256 to 511 in interface 1, data with SN 0 to 255 is processed later than data with SN 256 to 511 in interface 2. Now, if data with SN 512 to 767 are sent right after data with SN 256 to 511 in interface 1. When STA processed data with SN 512 to 767 in interface 1, the buffer is required to move 512 spaces. As a result, when data with SN 0 to 255 are processed later, all of them will be dropped.

For issue 1, 11ad has proposed flow control to address the issue. For issue 2, there is no existing solutions. For both issue 1, 11ad flow control may not work under the EHT context due to the following consideration:

It is possible that for multi-band context, the total SN space may be larger. As a result, the rule needs to be changed to accommodate the consideration of larger SN space. Multi-band BAR operation may change, and we need to accommodate for that IEEE 802.11ad has the flow control signaling in 11ad acknowledgement frame. EHT is likely to have its own acknowledgement frame with signaling to accommodate EHT consideration.

For issue 2, 11ad flow control rule requires the following change to work.

11ad assumes that the BuffSizeB for reception window and receiver memory are the same. To resolve issue 2, multi-band context will need to relax the requirement to allow higher speed under the constraint of processing delay.

11ad flow control does not allow the data before WinStartB to come. For issue 2, we will have to allow this case. We need to revise the meaning of passing up. Specifically, receiver should be allowed to delay passing up a SN, even when the SN does not have any received MSDU or A-MSDU Embodiments described herein provide a solution from the perspective of Tx side and Rx side for both issue 1 and issue 2. Essentially, what we propose is a generalized multi-band flow control operation.

From the perspective of Rx side, allow STA to delay the passing up of stored MSDU or A-MSDU to the next MAC process, or delaying the drop of reception of a MSDU or A-MSDU and passing the gaps to the next MAC process Have a pointer PassStartB to indicate the SN to be passed up to the next MAC address with stored MSDU or A-MSUD or without any MSDU or A-MSDU. Have STA maintain a total buffer space (TotalBufferSizeB) that can be larger than WinSizeB, the size of the reception window.

The total buffer size represents the sum of the space waiting to be passed up. Have STA maintain the highest acknowledged SN, PassEndB. This represents the highest SN that maybe passed up to the next MAC address with stored MSDU or A-MSUD or without any MSDU or A-MSDU. The receiver can indicate to the transmitter about total buffer size, TotalBufferSizeB, which includes the exact capacity to store packets. The receiver can indicate the remaining capacity of the MSDU/A-MSDU, WinCapacityB to be transmitted in the new variant of block acknowledgement frame. Define corresponding rule for the update based on the above consideration.

From the perspective of Tx side, the transmitter transmits MSDU/A-MSDU based on the remaining capability indicated by the receiver. These embodiment help resolve issue 1 and problem in multi-band context:

Accommodate the processing delay of each interface, which may happen for various implementation choices. Prevent possible data loss based on solution on receiver side or transmitter side. Resolve the problem of higher arriving data rate than internal processing speed.

In these embodiments, from receiver side. We start with the definition of new parameters. Allow STA to delay the passing up of stored MSDU or A-MSDU to the next MAC process or delay the drop of the reception of a MSDU or A-MSDU and passing the gaps to the next MAC process. Have a pointer PassStartB to indicate the SN to be passed up to the next MAC address with stored MSDU or A-MSUD or without any MSDU or A-MSDU. If PassStartB=WinStartB, it represents stopping passing up to the next MAC address. Have STA maintain a total buffer space (TotalBufferSizeB) that can be larger than WinSizeB, the size of the reception window.

Have STA maintain the highest SN, PassEndB, which represents the potential SN that maybe passed up to the next MAC address with stored MSDU or A-MSUD or without any MSDU or A-MSDU We continue with the setup of these parameters. STA on the receiver (RX) side indicates the capability to do multi-band flow control in receiver side. The indication can be in EHT capability element. STA on the RX side indicates TotalBufferSizeB to the transmitter, the indication can be in ADDBA request/response or an element in ADDBA request/response.

Assume that TotalBufferSizeB>=reception window size WinSizeB

STA on the rx side indicates WinCapacityB to the transmitter
  the indication can be in a new variant of EHT BA
  the indication can be in a new variant of EHT acknowledgement
  STA on the rx side indicates to the transmitter the processing delay of each interface
  The indication can be in an element of ADDBA request/response
  The transmitter indicates if support of multi-band flow control in transmitter side
  The indication can be in EHT capability element
  We continue with the discussion of initializing parameters at rx side as follows:

WinStartB, WinEndB, and WinSizeB follow the design of Multi-band data operation for initialization
  WinStartB=SSN from the ADDBA Request frame that elicited the ADDBA Response frame
  WindEndB=WinStartB+WinSizeB−1
  PassStartB=WinStartB
  PassEndB=WinStartB
  WinCapacityB=min [PassStartB+TotalBufferSizeB−1, WinEndB]−PassEndB+1

In the following, we describe the rules for updating the parameters on the rx side.

The receiver shall continue to pass SN with stored MSDUs or A-MSDUs or without stored MSDUs or A-MSDUs to the next MAC process order of increasing value of the SN based on implementation specific consideration, starting with the MSDU or A-MSDU that has SN=PassStartB and proceeding sequentially until there is no ready for the next sequential value of the SN or PassStartB hits WinStartB. Gaps may exist in the Sequence Number subfield values of the MSDUs or A-MSDUs that are passed up to the next MAC process.

Set PassStartB to the value of latest SN that was passed up to the next MAC process plus one. We describe two general principles before we continue to describe the update rule.

Make sure that PassEndB−PassStartB+1<=TotalBufferSizeB

Total space occupied to be passed up is smaller than the total size used for storing passing up.

Make sure that WinEndB−PassStartB+1<=2^(log 2(max SN+1)−1)

We continue with the detailed rules:
For a received MSDU or A-MSDU with SN,
If PassStartB<=SN<WinStartB
Store the received MPDU in the buffer if the MPDU is not yet received
If WinStartB<=SN<=WinEndB
Store the received MPDU in the buffer if the MPDU is not yet received, and have the following operation if the MPDU is not yet received
  If SN>PassEndB, Set PassEndB=SN.
  If PassEndB>PassStartB+TotalBufferSizeB−1,
  All MSDU buffers with sequence numbers from PassStartB to PassEndB−TotalBufferSizeB that were received correctly are passed to the next MAC process.
  Set PassStartB=PassEndB−TotalBufferSizeB+1.
  Set WinCapacity$_B$=min [PassStartB+TotalBufferSizeB−1,WinEndB]−PassEndB
  Set WinStartB to the value of the Sequence Number field of the first MSDU or A-MSDU that is missing to allow in-order delivery to the next MAC process.
  Set WinEndB=WinStartB+WinSizeB−1.
  If WinEndB-PassStartB+1>2^(log 2(max SN+1)−1)
  All MSDU buffers with sequence numbers from PassStartB to WinEndB−2^(log 2(max SN+1)−1) that were received correctly are passed to the next MAC process.
  Set PassStartB=WinEndB−2^(log 2(max SN+1)−1)+1.
  If PassStartB>PassEndB, set PassEndB=PassStartB.
  Set WinCapacityB=min [PassStartB+TotalBufferSizeB−1,WinEndB]−PassEndB+1 if PassEndB=WinStartB
  Set WinCapacityB=min [PassStartB+TotalBufferSizeB−1,WinEndB]−PassEndB if PassEndB is not equal to WinStartB
  If WinEndB<SN<PassStartB+2^(log 2(max SN+1)−1),
  Store the received MPDU in the buffer.
  Set WinEndB=SN.
  Set WinStartB=WinEndB−WinSizeB+1.

Update WinStartB to the value of the Sequence Number field of the first MSDU or A-MSDU that is missing to allow in-order delivery to the next MAC process.
Set WinEndB=WinStartB+WinSizeB−1
Set PassEndB=SN.
If PassEndB>PassStartB+TotalBufferSizeB−1
All MSDU buffers with sequence numbers from PassStartB to PassEndB−TotalBufferSizeB that were received correctly are passed to the next MAC process.
Set PassStartB=PassEndB−TotalBufferSizeB+1.
Set WinCapacityB=min [PassStartB+TotalBufferSizeB−1,WinEndB]−PassEndB.
If WinEndB−PassStartB+1>2^(log 2(max SN+1)−1)
All MSDU buffers with sequence numbers from PassStartB to WinEndB−2^(log 2(max SN+1)−1) that were received correctly are passed to the next MAC process.
Set PassStartB=WinEndB−2^(log 2(max SN+1)−1)+1.
If PassStartB>PassEndB, set PassEndB=PassStartB.
Set WinCapacityB=min [PassStartB+TotalBufferSizeB−1,WinEndB]−PassEndB+1 if PassEndB=WinStartB
Set WinCapacityB=min [PassStartB+TotalBufferSizeB−1,WinEndB]-PassEndB if PassEndB is not equal to WinStartB
If PassStartB+2^(log 2(max SN+1)−1)<=SN<PassStartB, discard the MPDU (do not store the MPDU in the buffer, do not pass the MSDU or A-MSDU up to the next MAC process).
For each received BlockAckReq frame or any BAR variant the block acknowledgment record that changes WinStartB by indicated SSN is modified as follows, where SSN is the value from the Starting Sequence Number field of the received BlockAckReq frame or any BAR variant:
If PassStartB<=SSN<WinStartB
make no changes to the record
If WinStartB<SSN<=WinEndB
Set WinStart$_B$=SSN.
Set WinEnd$_B$=WinStart$_B$+BufferSize$_B$−1.
Update WinStartB to the value of the Sequence Number field of the first MSDU or A-MSDU that is missing to allow in-order delivery to the next MAC process.
Set WinEnd$_B$=WinStartB+WinSizeB−1
If SSN>PassEndB, set PassEndB=SSN−1.
If PassEndB>(PassStarttB+TotalBufferSizeB−1),
All MSDU buffers with sequence numbers from PssStartB to PassEnd−TotalBufferSizeB, are discarded from the buffer.
Set PassStartB=PassEnd−TotalBufferSizeB+1.
Set WinCapacity$_B$=min[PassStartB+TotalBufferSizeB−1, WinEndB]−PassEndB.
If WinEndB−PassStartB+1>2^(log 2(max SN+1)−1)
All MSDU buffers with sequence numbers from PassStartB to WinEndB−2^(log 2(max SN+1)−1) that were received correctly are passed to the next MAC process.
Set PassStartB=WinEndB−2^(log 2(max SN+1)−1)+1.
If PassStartB>PassEndB, set PassEndB=PassStartB.
Set WinCapacityB=min [PassStartB+TotalBufferSizeB−1,WinEndB]−PassEndB+1 if PassEndB=WinStartB
Set WinCapacityB=min [PassStartB+TotalBufferSizeB−1,WinEndB]−PassEndB if PassEndB is not equal to WinStartB
If WinEnd$_B$<SSN<PassStartB+2^(log 2(max SN+1)−1)
Set WinStart$_B$=SSN.
Set WinEnd$_B$=WinStartB+WinSizeB−1.
Set PassEndB=SSN−1.
If PassEndB>(PassStartB+TotalBufferSizeB−1),
All MSDU buffers with sequence numbers from PassStartB to PassEndB−TotalBufferSizeB, are discarded from the buffer.
Set PassStartB=PassEndB−TotalBufferSizeB+1.
Set WinCapacityB=min [PassStartB+TotalBufferSizeB−1,WinEndB]−PassEndB+1 if PassEndB=WinStartB
Set WinCapacityB=min [PassStartB+TotalBufferSizeB−1,WinEndB]−PassEndB if PassEndB is not equal to WinStartB
If PassStartB+2^(log 2(max SN+1)−1)<=SSN<PassStartB, make no changes to the record.

We continue with our proposal from transmitter side.

If transmitter can be controlled by WinCapacityB, the transmitter shall not transmit an MPDU with a SN that is beyond the current recipient's buffer capacity (WinLimitO=MostSuccSN+WinCapacityO), where WinCapacityO to the received value of WinCapacityB indicated in the BlockAck frame.

Figure 6:
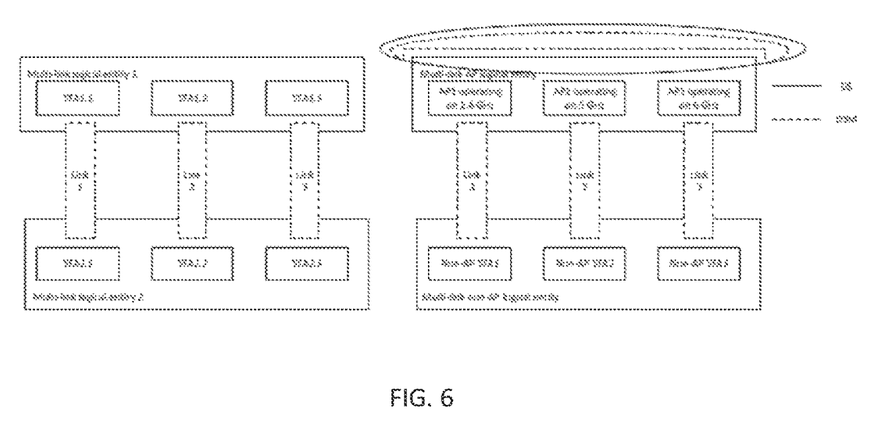
FIG. 6 illustrates multi-link framework in accordance with some embodiments.

MostSuccSN to the highest of the following two values: (SN of positively acknowledged MPDUs or the SSN−1, where SSN is in any BAR variant that moves WinStartB on the receiver side and is acknowledged). The transmitter will consider the processing delay when transmitting frames across the interfaces to avoid packet loss Some embodiments are directed to a neighbor report for an AP MLD. There are two multi-link logical entities on either side which includes multiple STAs that can setup link with each other. The detailed definition is shown in FIG. 6 and described in more detail below.

Multi-link logical entity: A logical entity that contains one or more STAs. The logical entity has one MAC data service interface and primitives to the LLC and a single address associated with the interface, which can be used to communicate on the DSM. NOTE—A Multi-link logical entity allows STAs within the multi-link logical entity to have the same MAC address. NOTE—The exact name can be changed For infrastructure framework, we have Multi-link AP logical entity, which includes APs on one side, and Multi-link non-AP logical entity, which includes non-APs on the other side. The detailed definition is illustrated in FIG. 6 and described in more detail below.

Multi-link AP device (AP MLD): A multi-link logical entity, where each STA within the multi-link logical entity is an EHT AP.

Multi-link non-AP device (non-AP MLD): A multi-link logical entity, where each STA within the multi-link logical entity is a non-AP EHT STA.

Note that this framework is a natural extension from the one link operation between two STAs, which are AP and non-AP STA under infrastructure framework.

Background: Discovery of an AP Through Neighbor Report

Neighbor report element is used in order for a reporting AP to provide information about another AP (usually from the same ESS). It is mainly used when included in a BSS Transition Management (BTM) request/response/query frame, where the objective is for an AP to inform an associated STA about neighboring APs that the STA could associate to, and to recommend or force the STA to roam/associate to.

It is also used to provide information about APs for unassociated STAs using the ANQP query protocol.

One issue is that the neighbor report allows to discover APs, and not AP MLDs. Embodiments described herein modify the neighbor report element in order to allow to discover AP MLDs.

Some embodiments modify the Neighbor Report element describing an AP, in order to provide the information that this AP is part of an AP MLD.

To achieve this, we can simply add a field in the BSSID information field called for instance: "part of an AP MLD". This field would be set to 1 if the AP is part of an AP MLD If we mandate that an EHT AP is always part of an AP MLD, to achieve this, we can simply add a field in the BSSID information field called "Extremely High Throughput". This field would be set to 1 if the AP is an EHT AP and would therefore be part of an AP MLD. We can also include another field describing the number of APs that are part of the same MLD.

Some embodiments modify the Neighbor Report element describing an AP, in order to be able in a frame to send multiple Neighbor Report elements describing multiple or all APs of an AP MLD. To achieve this, we can add a field in the BSSID information field called for instance: "part of same MLD as reporting AP". In this case, we would simply indicate that the reported AP is part of the same MLD as the reporting AP. To achieve this, we can add a field in the BSSID information field called for instance: "part of same MLD as AP reported in following neighbor report element". In this case, we would simply indicate that the reported AP is part of the same MLD as the reported AP that is reported in the neighbor report element that is sent right after this neighbor report element in the frame.

In order to report 3 APs of an AP MLD, the reporting AP would then transmit 3 neighbor report elements (one after the others) and set this new field to 1 for the 2 first neighbor report elements. The receiver would then make the connection between the 3 APs and know that they are part of the same AP MLD.

To achieve this, we can also define a new element, which contains an AP MLD address (which can be the upper MAC address of the AP MLD and which is unique in the AP MLD), and possibly could then include also the linkID, which would be the ID of the reported AP, within the AP MLD.

To achieve this, we can also use a multi-link element, which is meant to describe an AP MLD. This Multi-link element would have the structure of the multiple BSSID element, with a subelement for each AP, identified by their linkID. The subelement of one AP can contains multiple elements to describe the AP. We could then here include in the frame a multi-link element, which includes 3 (in our example) linkID subelements (one for each AP of the AP MLD), and each subelement containing a neighbor report describing the AP.

In some embodiments, the protocol for BSS transition management, as defined currently in the 802.11 specification for the transition between one AP to another AP, is modified for an EHT STA to enable the transition between one AP MLD to another AP MLD, by making the changes as follows:

Neighbor report(s) included in the BTM request frame describes the AP MLD (as described above) or one or more AP that are part of the AP MLD, with an indication that it is part of an AP MLD.

A non-AP MLD would then use reassociation frame to one of the reported neighbor AP that is part of the target neighbor AP MLD to perform a multi-link setup with the new AP MLD.

If the FT (Fast BSS Transition protocol) is used, it would be use at the AP MLD level and not at the AP level.

These embodiments allow for discovery of an AP MLD. These embodiments also allow the use of BSS transition management protocol between AP MLDs.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE draft specification IEEE P802.11ax/D4.0, February 2019, and IEEE Std 802.11ad-2012 are incorporated herein by reference.

Figure 7:
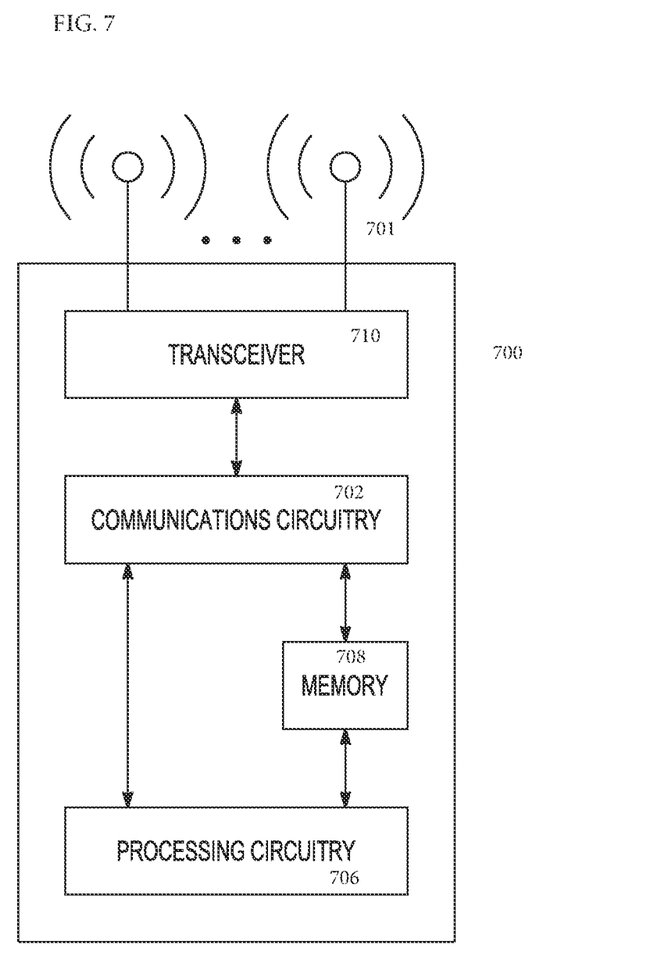
FIG. 7 illustrates a functional block diagram of a device in accordance with some embodiments.

In one embodiment, FIG. 7 illustrates a functional block diagram of a communication station that may be suitable for use as an AP, a STA or other user device in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP) the apparatus comprising: processing circuitry; and memory, the AP being one of a plurality of APs affiliated with a first AP multi-link device (AP MLD),
   wherein when the AP is configured to operate as a reporting AP, the processing circuitry is configured to:
   encode a Basic-Service Set (BSS) Transition Management (BTM) request frame for transmission to one or more associated non-AP stations (STAs), the BTM request frame to include a neighbor report element encoded to include information about one or more reported APs,
   wherein the processing circuitry is to encode the neighbor report element to indicate:
   using a first predetermined value, whether any of the one or more reported APs are APs of the plurality that are affiliated the first AP MLD; and
   using a second predetermined value, whether any of the one or more reported APs are APs that affiliated with a second AP MLD, wherein the reporting AP is not affiliated with the second AP MLD, and
   wherein to report APs from multiple AP MLDs including at least one AP that is affiliated with the first AP MLD with which the reporting AP is affiliated and at least one AP that is affiliated with the second AP MLD with which the reporting AP is not affiliated, processing circuitry is configured to encode the neighbor report element to:
   identify the at least one AP that is affiliated with the first AP MLD with which the reporting AP is affiliated; and
   identify the at least one AP that is affiliated with the second AP MLD with which the reporting AP is not affiliated.

2. The apparatus of claim 1, wherein the processing circuitry is further configured to decode a reassociation frame from one of the non-AP STAs for transition from one of the APs of the first AP MLD to one of the reported APs of the second AP MLD.

3. The apparatus of claim 2, wherein the one or more associated non-APs are associated with one of the APs of the first AP MLD.

4. The apparatus of claim 3, wherein some of the one or more associated non-AP STAs are part of a non-AP MLD, the first AP MLD, the second AP MLD, and the non-AP MLD comprising logical entities.

5. The apparatus of claim 4 wherein the first AP MLD is configured for multi-link operation, wherein two or more links with the non-AP MLD are aggregated in which each of the aggregated links use a same traffic identify (TID).

6. The apparatus of claim 3, wherein the reassociation frame is to initiate a fast BSS transition protocol.

7. The apparatus of claim 3, wherein the reassociation frame is received from one of the non-AP STAs for transition to one of the reported APs that are indicated to be part of the first AP MLD.

8. The apparatus of claim 1, wherein when the reporting AP is an extremely high throughput (EHT) AP, the processing circuitry is configured to encode the neighbor report element to set an EHT BSSID information field to indicate that the AP is the EHT AP and part of the first AP MLD.

9. A non-transitory computer-readable storage medium that stores instructions for execution by processing circuitry of an access point (AP), the AP being one of a plurality of APs affiliated with a first AP multi-link device (AP MLD), wherein when the AP is configured to operate as a reporting AP, the processing circuitry is configured to:
   encode a BSS Transition Management (BTM) request frame for transmission to one or more associated non-AP stations (STAs), the BTM request frame to include a neighbor report element encoded to include information about one or more reported APs,
   wherein the processing circuitry is to encode the neighbor report element to indicate:
   using a first predetermined value, whether any of the one or more reported APs are APs of the plurality that are affiliated the first AP MLD; and
   using a second predetermined value, whether any of the one or more reported APs are APs that affiliated with a second AP MLD, wherein the reporting AP is not affiliated with the second AP MLD, and
   wherein to report APs from multiple AP MLDs including at least one AP that is affiliated with the first AP MLD with which the reporting AP is affiliated and at least one AP that is affiliated with the second AP MLD with which the reporting AP is not affiliated, processing circuitry is configured to encode the neighbor report element to:

identify the at least one AP that is affiliated with the first AP MLD with which the reporting AP is affiliated; and
identify the at least one AP that is affiliated with the second AP MLD with which the reporting AP is not affiliated.

10. The non-transitory computer-readable storage medium of claim 9, wherein the processing circuitry is further configured to decode a reassociation frame from one of the non-AP STAs for transition from one of the APs of the first AP MLD to one of the reported APs.

11. The non-transitory computer-readable storage medium of claim 10, wherein the one or more associated non-AP STAs are associated with one of the APs of the first AP MLD.

12. The non-transitory computer-readable storage medium of claim 11, wherein some of the one or more associated non-AP STAs are part of a non-AP MLD, the first AP MLD, the second AP MLD and the non-AP MLD comprising logical entities.

13. The non-transitory computer-readable storage medium of claim 12 wherein the first AP MLD is configured for multi-link operation, wherein two or more links with the non-AP MLD are aggregated in which each of the aggregated links use a same traffic identify (TID).

14. The non-transitory computer-readable storage medium of claim 11, wherein the reassociation frame is to initiate a fast BSS transition protocol.

15. The non-transitory computer-readable storage medium of claim 11, wherein the reassociation frame is received from one of the non-AP STAs for transition to one of the reported APs that are indicated to be part of the first AP MLD.

* * * * *